Figure 4:
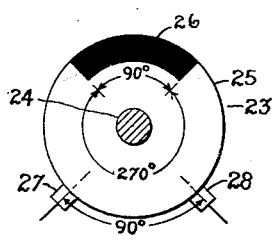

March 27, 1951 H. C. ROEMKE 2,546,783
SPEED CONTROL SYSTEM FOR DIRECT CURRENT MOTORS
Filed Oct. 12, 1948 3 Sheets-Sheet 1
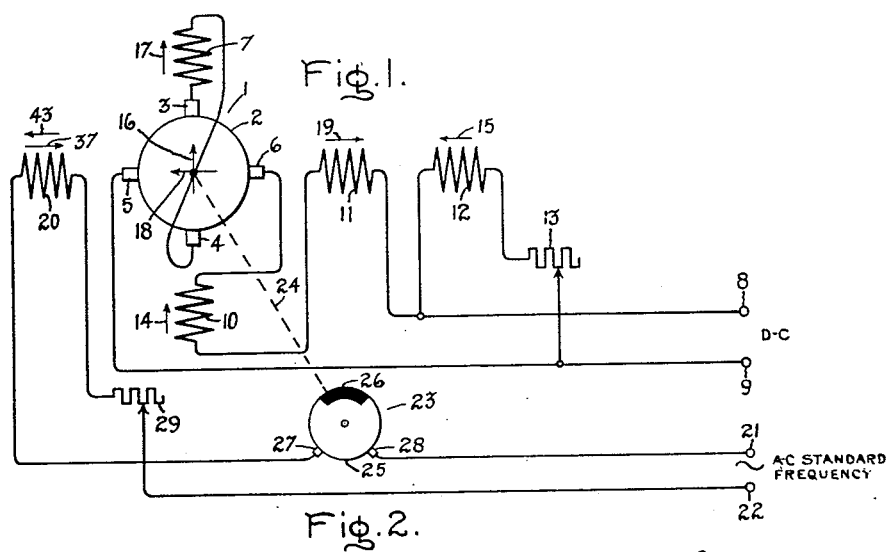
Fig.1.
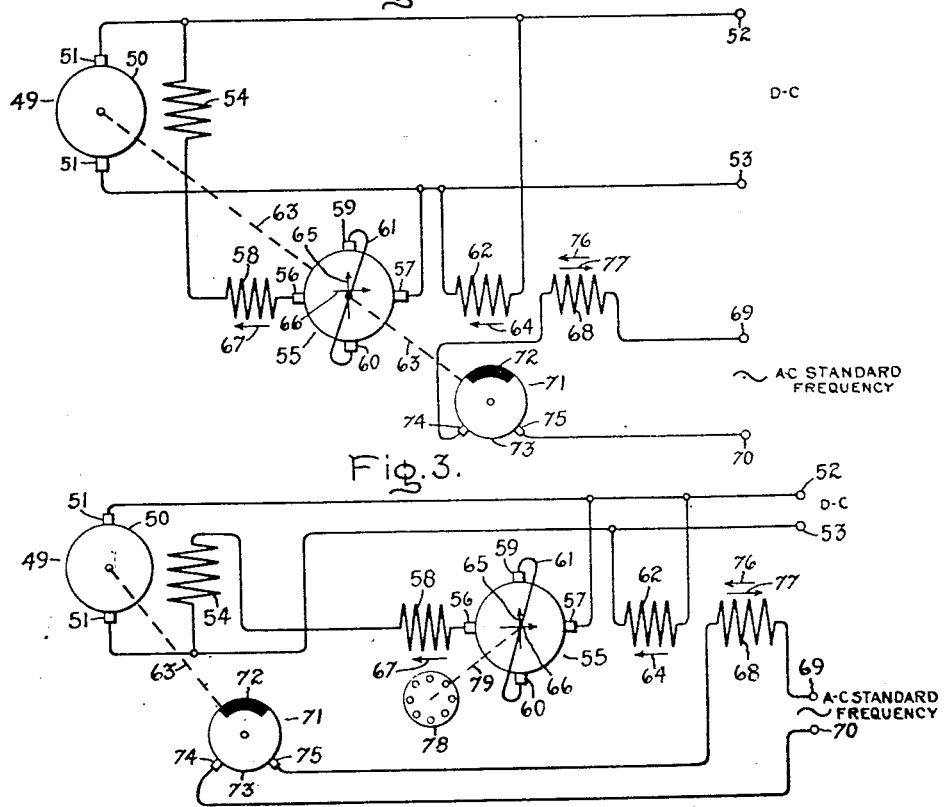
Fig.2.
Fig.3.
Inventor:
Henry C. Roemke,
by Rowell F. Mack
His Attorney.

March 27, 1951     H. C. ROEMKE     2,546,783
SPEED CONTROL SYSTEM FOR DIRECT CURRENT MOTORS
Filed Oct. 12, 1948     3 Sheets-Sheet 2

60 CYCLE TIMING WAVE

Inventor:
Henry C. Roemke,
by *Browell S Mack*
His Attorney.

60∼ TIMING WAVE

60∼ TIMING WAVE

Patented Mar. 27, 1951

2,546,783

UNITED STATES PATENT OFFICE 2,546,783

SPEED CONTROL SYSTEM FOR DIRECT-CURRENT MOTORS

Henry C. Roemke, Fort Wayne, Ind., assignor to General Electric Company, a corporation of New York Application October 12, 1948, Serial No. 54,174

16 Claims. (Cl. 318—321)

1

This invention relates to speed control systems for direct current motors and more specifically to a system for operating direct current motors at synchronous speed.

In many applications for motors, it is desirable to provide a motor which will operate at constant speed under varying conditions of line voltage and load. A number of different types of constant speed motors are well known in the art and include the alternating current synchronous motor, direct current and alternating current centrifugal contact regulated motors, and to a lesser extent the direct current shunt motor and alternating current induction motors. Of these, the alternating current synchronous machine is the only one which operates at a true constant exact speed. In some instances, however, there is a need for a direct current motor, subject to conditions of varying line voltage, temperature and load, which will operate in true synchronism with a source of standard frequency alternating current. In such a direct current motor, synchronous speed is defined as the speed expressed in rotations per second which is equal to or evenly divisible into the frequency in cycles per second. In order to maintain the speed of a direct current motor at an exact value, it is necessary to excite a speed controlling field winding so that the field flux of the motor is increased responsive to an increase of speed and conversely decreased responsive to a decrease of speed, thereby keeping the speed of the motor at the same value. If a direct current motor is to be maintained in synchronism with a source of standard frequency alternating current, it will be necessary to provide excitation responsive not only to the speed, but also to the alternating current frequency. Furthermore, if the motor is to be adaptable for use over a wide range of synchronous operating speeds, it is desirable that the synchronizing energy required from the master frequency alternating current supply be relatively small permitting the use of a signal generator for the source of synchronizing alternating current. While a conventional direct current shunt excited motor with a separate regulating field winding can be used for synchronous operation, the armature reaction excited dynamoelectric machine, of the type referred to as an amplidyne, is particularly well suited for this use since the energy required for excitation of the control field exciting windings is comparatively low. Such a machine adapted for synchronous operation may be used either directly as a motor, or as a generator to provide excitation to a larger conventional direct current motor. A number of methods of speed control for conventional direct current motors and direct current amplidynes are presently in use, such as centrifugal regulators and direct connected tachometer generators; however, in each case, variables such as winding temperatures and mechanical fluctuations in the speed control apparatus prevent these motors from operating at a truly synchronous or exact speed.

An object of this invention is to provide a simple control system for operating a direct current motor at synchronous speed under varying conditions of line voltage and load.

Another object of this invention is to provide an improved control system for maintaining a direct current motor at exact speed.

A further object of the invention is to provide an improved control system for varying the speed of a direct current motor and for maintaining the motor speed exactly at the speed selected.

Further objects and advantages of this invention will be better understood from the following description referring to the accompanying drawing. The features of novelty which characterize this invention will be pointed out with particularity in the claims annexed to and forming a part of this specification.

In the preferred embodiment of this invention, a direct current amplidyne motor is provided with a direct current-energized main control field and a regulating control field arranged for excitation from a source of standard frequency alternating current. A mechanical circuit interrupter driven by the motor is arranged in series with the regulating control field and allows current to flow thereto during half of each revolution of the motor. Assuming that the source of standard frequency alternating current is 60 cycles, the synchronous speed will be 60 rotations per second or 3600 R. P. M., and the mechanical interrupter at that speed will allow alternating current to flow to the regulating control field during one-half of each cycle. The mechanical interrupter, therefore, acts as a synchronous switch or valve to admit rectified positive or negative half cycles of the control frequency to the regulating field to provide differential or cumulative action on the direct current-energized main control field. If there is a tendency of the motor to increase or decrease speed, the mechanical interrupter will admit a more positive or more negative half of each cycle to the regulating control field, thus increasing or decreasing the excitation produced by the main control field to return the speed of the motor to the correct value.

Figure 5:
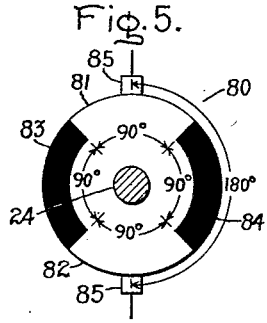
Figure 6:
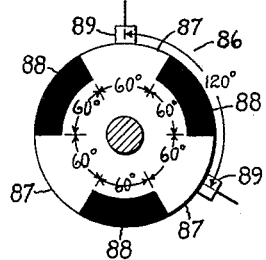
Figure 7:
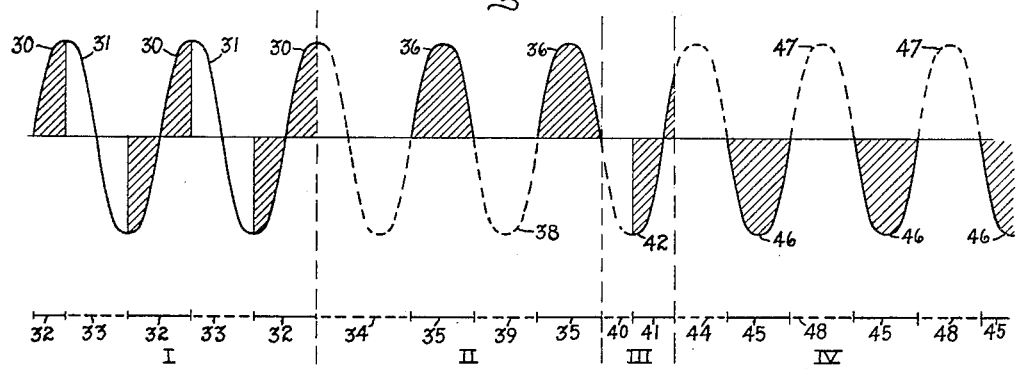
Figure 8:
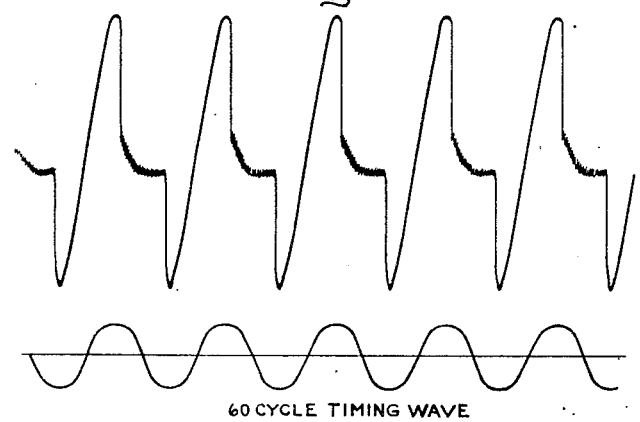
Figure 9:
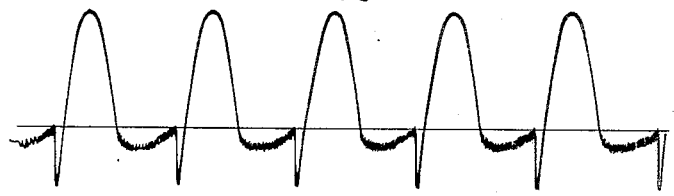
Figure 9:
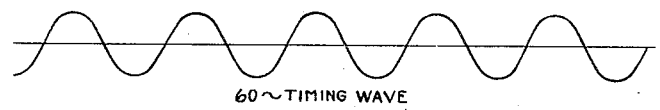
Figure 10:
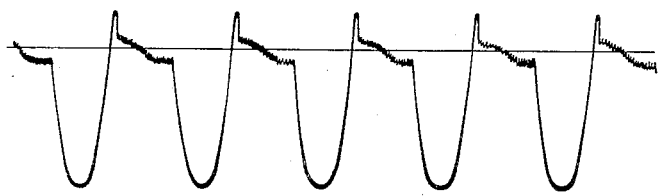
Figure 10:
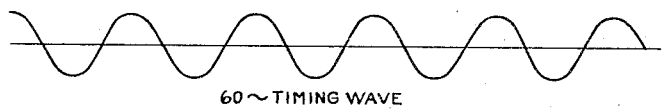
Figure 11:
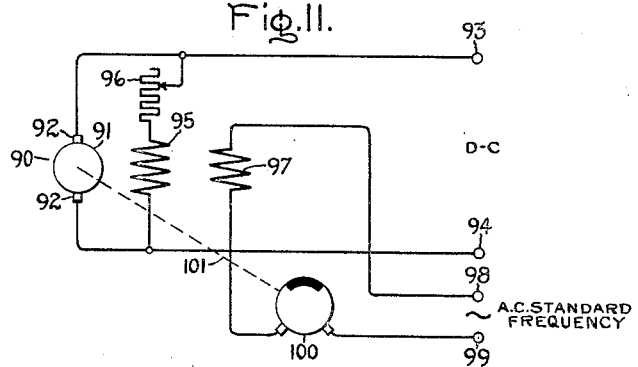

In the drawings, Fig. 1 illustrates schematically a preferred embodiment of this invention wherein an amplidyne-type motor is provided with the improved synchronizing control system of this invention; Fig. 2 is a schematic illustration of another embodiment of this invention used to maintain the speed of a conventional direct current motor in synchronism; Fig. 3 illustrates a modification of the embodiment of Fig. 2; Figs. 4, 5, and 6 illustrate various types of mechanical interrupters adaptable for use in the embodiments of Figs. 1 through 3; Fig. 7 illustrates for purposes of explanation the wave produced by the source of standard frequency alternating current and the portion passed by the mechanical interrupter and impressed upon the regulating control field during various stages of operation; Figs. 8 through 10 show oscillograms of the voltage impressed upon the regulating control field of a machine constructed in accordance with Fig. 1 for various conditions of load and line voltage; and Fig. 11 illustrates schematically a conventional direct current shunt motor arranged for synchronization in accordance with this invention.

Referring now to Fig. 1, there is shown a motor 1 of the armature reaction excited variety having an armature 2 provided with windings and a commutator of the conventional type. The motor is provided with a pair of primary or quadrature brushes 3 and 4 and a pair of secondary or direct axis brushes 5 and 6 displaced about the commutator 90 electrical degrees from the quadrature brush set. The quadrature brushes 3 and 4 are connected together by a quadrature field exciting winding 7, this connection amounting essentially to a short circuit. The direct axis brushes 5 and 6 are connected to an external source of direct current through lines 8 and 9, a series starting field exciting winding 10 and a compensating field exciting winding 11 being arranged in series with the direct axis brush 6. A main control field exciting winding 12 is connected across the lines 8 and 9 with variable resistor 13 serving to adjust the excitation produced thereby.

When lines 8 and 9 are connected to a source of direct current voltage, current will flow through the armature windings between the direct axis brushes 5 and 6. Series starting field exciting winding 10 being in series with the direct axis brushes produces excitation along the quadrature axis of the machine, as shown by the arrow 14. At the instant of starting from rest, the flux produced by the series starting field exciting winding 10 co-acts with the current flowing between the direct axis brushes 5 and 6 to produce initial starting torque. The main control field exciting winding 12 produces excitation along the direct axis of the machine 9 shown by the arrow 15. As the armature begins to rotate, the flux produced by the control field exciting winding 12 is cut by the armature conductors between the quadrature brushes 3 and 4 and a speed voltage is generated therebetween. Since the quadrature brushes 3 and 4 are connected by a low resistance connection through the quadrature field exciting winding 7, a heavy flow of current will result in the quadrature circuit between the quadrature brushes 3 and 4 produced by the speed voltage generated between these brushes. It will be readily apparent that by virtue of the low resistance connection between the quadrature brushes 3 and 4, only a very small amount of flux need be provided by the main control field exciting winding 12 in order to produce the heavy flow of armature current between the quadrature brushes. This heavy flow of quadrature current flowing in the armature windings between the quadrature brushes 3 and 4 produces primary armature reaction flux in the quadrature axis as shown by the arrow 16. This quadrature or primary armature reaction flux co-acts with the current flowing between the direct axis brushes 5 and 6 to provide the running torque. The primary armature reaction flux 16 provides the major component of the main field excitation of the machine, additional components being provided by the quadrature field exciting winding 7 which produces excitation in the quadrature axis as shown by the arrow 17 and the series starting field exciting winding 10. In addition to the primary armature reaction flux 16 produced by the short circuit current flowing in the quadrature armature circuit, the current flowing in the direct axis circuit between the direct axis brushes 5 and 6 produces an armature reaction flux indicated by the arrow 18. It will be readily seen that the direct axis armature reaction flux is in the same plane as the excitation 15 produced by the control field exciting winding 12. In the case of a motor, as shown here, the direct axis armature reaction 18 and the main control field excitation 15 are cumulative. However, in a generator they are in opposition. In any event, the direct axis, or secondary armature reaction will, unless neutralized, completely override and destroy the effect of the main control field exciting winding 12. In order to neutralize the secondary armature reaction, compensating field exciting winding 11, arranged in series with the direct axis brushes 5 and 6, produces a component of excitation in the direct axis as indicated by the arrow 19. This excitation is in opposition to the secondary armature reaction 18 and, since both the secondary armature reaction 18 and the compensating field exciting winding excitation 19 are produced by the load current flowing in the direct axis circuit, by proper adjustment, the compensating field exciting winding 11 can be made to substantially neutralize the secondary armature reaction. As thus far described, this is a conventional armature reaction excited motor of the type commonly referred to as an amplidyne. The term amplidyne defines an armature reaction excited dynamoelectric machine provided with a compensating winding to neutralize the secondary armature reaction.

In order to secure synchronous operation of the machine of Fig. 1, a regulating field exciting winding 20 is provided which is adapted to produce excitation in the direct axis of the machine. This regulating control field exciting winding is arranged for excitation from a source of standard frequency alternating current through lines 21 and 22. Arranged in series with the regulating control field exciting winding is a mechanical interrupter 23 driven from motor 1 by shaft 24. The interrupter 23 has a 270° conducting portion 25 with a 90° insulating portion 26, and is contacted by two brushes 27 and 28 spaced apart by 90°. This interrupter is shown more clearly in Fig. 4 of the drawing. Variable resistor 29 serves to adjust the excitation produced by the regulating control field exciting winding 20. The mechanical interrupter 23, as will be apparent from inspection of Fig. 4, will conduct during 180° or half of each revolution of the armature 2. Assuming now that the source of standard frequency alternating current is 60 cycles, the synchronous speed for the motor 1 will be 60 rotations per second or 3600 R. P. M. and the mechanical interrupter 23, at that speed, will allow alternating current to flow to the regulating control field exciting winding 20 during one-half of each cycle of the alternating current standard frequency source.

Referring now to Fig. 7 in addition to Fig. 1, there is shown the voltage wave form of the alternating current standard frequency source across the lines 21 and 22. Referring specifically to condition I, in which the motor is assumed to be operating at exactly 3600 R. P. M., the half cycles passed by the mechanical interrupter 23 are indicated by the solid portions 30 of the wave and the half cycles rejected by the interrupter are shown by the dashed portions 31. The periods during which the interrupter 23 allows current to flow to the regulating control field exciting winding 20 are indicated by the solid lines 32 and the periods during which the interrupter is nonconducting are indicated by the dashed lines 33. Now assuming that the main field control winding 12 alone provides exactly sufficient excitation to operate the motor at 3600 R. P. M., the interrupter 23 is passing half cycles cut off exactly at the positive and negative peak point, thus transmitting interrupted alternating current to the regulating control field winding 20 and thereby making it inoperative. Referring now to condition II of Fig. 7, it is assumed that a heavier load is suddenly placed on motor 1. This causes the interrupter 23 to be nonconductive during a slightly longer period 34, and the next conducting period 35, therefore, passes a positive half cycle 36 which is impressed upon the regulating control field exciting winding 20. The positive half cycle 36 is in effect rectified direct current and causes the regulating control field exciting winding to produce excitation in the direction shown by the arrow 37. This excitation is in the proper direction to buck the excitation 15 produced by the main control field exciting winding 12, thus decreasing the net control excitation producing a substantially instantaneous increase in motor speed to return it to 3600 R. P. M. As long as this load is maintained on the motor, the interrupter 23 will continue to pass the positive half cycles 36 during conducting intervals 35 and to reject the negative half cycles 38 during nonconducting periods 39. In condition III, it is assumed that the entire load is suddenly removed from the motor, thereby producing a resultant tendency to speed up. The next nonconducting period 40 will be much shorter than the immediate preceding conducting period 35 and results in the next conducting period 41 passing a portion 42 of the voltage wave which is considerably more negative than positive. This amounts to the excitation of the regulating control field exciting winding 20 with rectified direct current of the opposite polarity producing excitation in the direction shown by the arrow 43. This excitation is in a direction to boost the excitation 15 produced by the main field exciting winding 12, thus increasing the total net control excitation on the machine with a corresponding decrease in speed. Assuming, however, that this impulse of rectified direct current of opposite polarity is not sufficient to return the speed to 3600 R. P. M., as shown in condition IV, the next nonconducting interval 44 of the interrupter 23 will be longer than the preceding conducting interval 41 which in turn was longer than the preceding nonconducting interval 40. This causes the conducting period to shift further and the next conducting period 45 will pass a negative half cycle 46, thus providing maximum boosting excitation from the regulating control field exciting winding 20. As long as the machine remains unloaded, the interrupter 23 will continue to reject the positive half cycles 47 during the nonconductive intervals 48 and will pass the negative half cycles 46 during conducting periods 45.

The circuit arrangement of Fig. 1 was tested using a 1/8 horse power, 250 volt, direct current amplidyne motor with a 60 cycle standard frequency synchronizing voltage. Using the interrupter of Fig. 4 with a load drawing 117 watts from the direct current source, the motor was held at exactly 3600 R. P. M. Fig. 8 shows an oscillogram of the voltage wave form across the regulating control field exciting winding at this load. It can be readily seen that the interrupter is passing equal portions of the upper and lower alternating current wave thereby rendering the differential control field winding ineffective with the main control field exciting winding adjustment close enough to hold the 3600 R. P. M. speed. The load was then increased until 254 watts were drawn from the direct current source, the speed remaining constant at 3600 R. P. M. Fig. 9 shows the oscillogram of the voltage wave across the regulating control field exciting winding at this load. It will be seen that the interrupter is now passing nearly all of the upper loop of the alternating current wave and very little of the lower loop. Thus, nearly the maximum effect of the regulating control field winding of weakening the main control field exciting winding is produced. Here, with maximum load, the synchronous speed is held constant, since as the load was applied, the motor tended to slow down and the wave portion allowed to pass by the interrupter was shifted. The load was next removed entirely with the result shown in Fig. 10. Here nearly all of the lower loop and little of the upper loop is passed by the interrupter. The current in the regulating control field exciting winding is now flowing in the opposite direction with the result that the regulating control field exciting winding boosts the main control field exciting winding. In these three tests, the direct current voltage was held constant at 250 volts. The machine was next tested using the same load as that used for the test of Fig. 9, however, with the direct current supply raised to 270 volts. This, of course, would tend to speed up the motor; however, the speed remained at 3600 R. P. M. with a wave form almost identical as that shown in Fig. 10 indicating that the interrupter was passing negative half cycles, thus causing the regulating control field exciting winding to boost the main field exciting winding to hold the speed constant. With the load remaining the same, the direct current was then lowered to 170 volts, and the wave form in that instance was almost identical to that shonw in Fig. 9, the interrupter passing positive half cycles, thus producing a bucking effect on the main control field exciting winding to increase the speed to the proper value. Thus, it will be seen that from no load to maximum load and from 68% to 108% of rated voltage, a motor arranged in accordance with Fig. 1 maintained exactly 3600 R. P. M. The same machine was also tested with a constant 250 volt direct current source but with a variable frequency oscillator for the alternating current synchronizing source. With frequencies of 50, 60 and 70 cycles impressed on the regulating control field exciting winding, the motor speed was 3000, 3600 and 4200 R. P. M., respectively, illustrating that with this invention the speed can be varied by merely varying the frequency of the alternating current source. However, as illustrated by the above-described tests, once the speed is selected, the motor will hold that speed exactly over a wide range of load and line voltage.

Referring now to Fig. 2, there is shown an arrangement for maintaining the speed of a conventional direct current motor 49 in synchronism with a source of standard frequency alternating current. Here, the motor 49 is provided with a conventional armature and commutator 50, and brushes 51 energized from a source of direct current by lines 52 and 53. The motor 49 is provided with a shunt field exciting winding 54 arranged for direct current excitation from the lines 52 and 53. A direct current amplidyne generator 55 has its direct axis brushes 56 and 57 arranged in series with the motor shunt field exciting winding 54. The amplidyne generator 55 is provided with a compensating field exciting winding 58 in series with the direct axis brushes 56 and 57 and its quadrature brushes 59 and 60 are short circuited by a conductor 61. The generator has a main control field exciting winding 62 arranged for direct current excitation from lines 52 and 53 and is driven by the motor 49 through shaft 63. Assuming that the motor 49 is rotating, the amplidyne main control field exciting winding 62 produces excitation in the direct axis as shown by the arrow 64. This flux is cut by the armature conductors between the quadrature brushes 59 and 60 generating a speed voltage therebetween. By virtue of the short circuit connection 61, this speed voltage causes a heavy flow of current through the armature between the quadrature brushes. This heavy flow of quadrature or primary armature current produces quadrature or primary armature reaction in the direction shown by the arrow 65. This primary armature reaction flux is cut by the armature conductors between the direct axis or load brushes 56 and 57 also generating a speed voltage therebetween. Depending upon the polarity and magnitude of the excitation produced by the amplidyne main control field exciting winding 62, the amplidyne generated voltage across the direct axis brushes 56 and 57 will buck or boost the excitation produced by the motor shunt field exciting winding 54. As in the case of the amplidyne motor of Fig. 1, the load current flowing in the armature conductors between the direct axis brushes 56 and 57 produces a seconday armature reaction in the direct axis, as shown by the arrow 66. In a generator, as shown here, the secondary armature reaction opposes the main control field excitation 64. Therefore, in order to neutralize substantially the secondary armature reaction 66 and thus prevent its overriding and destroying the effect of the main control field excitation 64, the compensating field exciting winding 58 is arranged to produce excitation in the direct axis opposed to the secondary armature reaction 66, as shown by the arrow 67. Since both the secondary armature reaction and the compensating field excitation are produced by the load current, proper adjustment of the compensating field exciting winding 58 can produce substantial neutralization of the secondary armature reaction.

In order to produce synchronous operation of the direct current motor 49, the arrangement now to be described is provided. The amplidyne generator 55 is provided with a regulating control field exciting winding 68 adapted to be energized from a source of standard frequency alternating current from lines 69 and 70. A mechanical interrupter 71 having a 90° nonconducting portion 72 and a 270° conducting portion 73 is driven by the motor 49 through shaft 63, in common with the amplidyne generator 55, and is provided with a pair of contact brushes 74 and 75 spaced apart by 90° and arranged in series with the regulating control field exciting winding 68. When the motor 49 is operating at synchronous speed, the mechanical interrupter 71 will allow alternating current to flow to the regulating control field winding 68 during half of each motor revolution. Thus, the interrupter 71 acts as a synchronous switch to impress half of each cycle of the standard frequency alternating current on the regulating control field winding 68 when the motor 49 is operating at synchronous speed.

The synchronizing operation of the amplidyne generator 55, regulating control field exciting winding 68 and the interrupter 71 is very similar to the operation of the embodiment of Fig. 1. Here, a tendency for the motor 49 to decrease speed below the synchronous value causes the half cycles of alternating current passed by the interrupter 71 to shift impressing a more positive half cycle on the regulating control field winding 68. This produces excitation in the direction shown by the arrow 76 which boosts the excitation 64 produced by the amplidyne main control field exciting winding 62, thus increasing the net control field excitation on the amplidyne generator 55 with a resultant increase in its direct axis generated voltage. This increased direct axis generated voltage bucks the motor shunt field exciting winding 54 reducing the net field excitation on the motor 49 causing an increase in speed to the synchronous value. Conversely, a tendency for the motor 49 to increase speed causes the interrupter 71 to pass more negative half cycles of alternating current so that the excitation produced by the regulating control field exciting winding 68 is in the direction shown by the arrow 77. This excitation bucks the excitation 64 produced by the amplidyne main control field exciting winding 62 reducing the net control field excitation on the amplidyne generator 55 which, in turn, lowers the direct axis generated voltage and increases the excitation produced by the motor shunt field exciting winding 54 to decrease the motor speed.

It will be readily apparent that by the proper proportioning of the regulating control field exciting winding 68 and the magnitude of the alternating current standard frequency voltage on the lines 69 and 70, the direct axis output voltage of the amplidyne generator 55 can be completely reversed in polarity responsive to an increase or decrease of speed of the motor 49 to buck or boost the motor shunt field exciting winding 54. A 3 horsepower motor was tested utilizing the circuit of Fig. 2 with the same amplidyne and interrupter used in the tests on the embodiment of Fig. 1. Here, before the 60 cycle alternating current source was connected to the lines 69 and 70, the speed of the motor 49 varied from 3200 R. P. M. at 120 volts direct current to 3800 R. P. M. at 200 volts, there being no load on the motor. After the 60 cycle synchronizing alternating current source was connected, the speed of the motor remained at 3600 R. P. M. over the same terminal voltage range.

Referring now to Fig. 3 in which like elements are indicated by like reference numerals, there is shown a modification of the embodiment of Fig. 2 wherein the amplidyne generator 55 is interdriven by a separate external motor 78 through shaft 79 rather than by the direct current motor 49 through the shaft 63. The operation of this embodiment is identical with that shown in Fig. 2 and a motor synchronized in accordance with this figure maintained constant 3600 R. P. M. speed over a direct current line voltage range of 140 to 215 volts. The voltage across the motor shunt field exciting winding 54 was measured during this test and, at 140 direct current line volts, was 118 volts indicating the bucking action of the amplidyne generator 55. At a direct current line voltage of 215 the motor shunt field voltage was 240 indicating the boosting action of the amplidyne generator.

In the above description, the use of a two-pole interrupter, as shown in Fig. 4, which passes current during half of each revolution was described. If it is desired to operate a motor at 1800 R. P. M. with a 60 cycle synchronizing alternating current source rather than at 3600 R. P. M., this can be accomplished with a four-pole interrupter as shown in Fig. 5 which provides two interruptions for each revolution. Here the interrupter 80 is provided with two 90° conducting portions 81 and 82 and two 90° nonconducting portions 83 and 84. The brushes 85 are spaced apart by 180°. Thus, at a speed of 1800 R. P. M., the interrupter will still pass one-half of each cycle of the synchronizing alternating current voltage to produce the synchronizing action. In Fig. 6 there is shown a three-portion interrupter 86 having three 60° conducting portions 87 and three 60° nonconducting portions 88. The brushes 89 in this interrupter are spaced apart by 120°. With this three-pole interrupter, a direct current motor can be operated at 1200 R. P. M. from a 60 cycle source of synchronizing alternating current voltage. In the description of these interrupters, the brush thickness is assumed to be negligible. In actual practice, the period of interruption equals the width of the insulating segment minus the brush thickness. Thus, to obtain 60°, 90° or 180° interruption, the insulating segment must equal the desired angle plus the brush thickness. It can, therefore, be readily seen that the speed of the motor cannot only be varied by varying the frequency of the synchronizing source of alternating current voltage, but can also be varied by changing the number of interruptions provided by the mechanical interrupter.

From the above description, it will be readily apparent that it is not necessary to use an amplidyne-type motor or generator to obtain synchronous operation. Referring now to Fig. 11, there is shown a conventional direct current shunt motor 90, having an armature 91 provided with a commutator and brushes 92 arranged for excitation from a source of direct current by lines 93 and 94. A shunt field exciting winding 95 is arranged across the lines 93 and 94 and is adjustable for the correct speed under middle voltage, load and temperature conditions by a variable resistor 96. A regulating field exciting winding 97 is excited from the source of standard frequency alternating current by lines 98 and 99 through interrupter 100, which may be one of the types shown in Figs. 4, 5 and 6. The interrupter 100 is driven by the motor 90 through shaft 101. The regulating field exciting winding 97 is adjusted to have zero effect on the shunt field exciting winding 95 at the middle condition. However, it provides a differential or cumulative effect due to the action of the interrupter for higher or lower conditions of direct current line voltage, load or temperature, as required to maintain the speed constant.

To summarize, this invention provides means for synchronizing the speed of a conventional direct current motor, a direct current amplidyne motor, or a conventional direct current motor through an intermediate amplidyne generator, with a master frequency alternating current supply, the motor operating in true synchronism under conditions of varying line voltage, temperature and load. In accordance with this invention, the conventional motor, amplidyne motor, or amplidyne bucking and boosting generator for a conventional motor, is provided with a regulating control field adapted to be connected to the master frequency alternating current supply by a synchronous switch driven by the motor. The synchronous switch generates no frequency, but selects positive or negative half cycles of alternating current wave to be impressed upon the differential control field. The synchronous switch thus acts as a rectifier and the regulating control field provides bucking or boosting action on the main control field responsive to the polarity of the half cycles passed by the switch. A tendency of the motor to change speed causes the portion of the wave selected by the switch to shift impressing more positive or more negative portions of each half cycle on the regulating control field to increase or decrease the bucking or boosting effect of the regulating control field on the main control field with a resultant increase or decrease of the net motor excitation to maintain the motor speed at the synchronous value.

This arrangement is characterized by its extreme simplicity and the good starting, running and breakdown torque characteristics of the motor, a direct current motor synchronized in accordance with this invention having greater output than comparable alternating current synchronous motors. The synchronizing elements have no effect on the starting or operating characteristics of the motor and, if an amplidyne motor is used, by virtue of the well-known amplidyne characteristics, a signal generator can be used for the standard frequency source, thus permitting great flexibility in the available operating speeds since stepless speed change is effected by merely changing the frequency. The speed of a motor synchronized in accordance with this invention is exact and depends only upon the frequency of the alternating current and the number of insulating and conducting segments of the interrupter and the spacing of the interrupter brushes, the only adjustments required being those to give the proper power output at the desired speed. The number of poles of a direct current motor synchronized in accordance with this invention has no effect on the speed, the only requirement being that the motor windings be properly designed to produce the desired power at the predetermined synchronous speed.

While there is illustrated and described particular embodiments of this invention, modifications thereof will occur to those skilled in the art. I desire it to be understood, therefore, that this invention is not to be limited to the particular arrangements disclosed, and I intend in the appended claims to cover all modifications which do not depart from the spirit and scope of this invention.

What I claim as new and desire to secure by Letters Patent of the United States is:

1. In combination, a direct current motor having a direct current-energized field exciting winding, means adapted to be excited by a source of standard frequency alternating current for modifying the excitation produced by said motor field winding, and a synchronous switch driven by said motor, said switch having a conducting portion and a non-conducting portion and being arranged in series with said source of alternating current so that said modifying means is connected to said source of alternating current during half of each cycle thereof, said modifying means increasing or decreasing the excitation produced by said motor field winding in response to the polarity of said half cycles passed by said switch, said switch connecting said modifying means to said source of alternating current during a more negative or more positive half of each cycle of said alternating current in response to a slight change of speed of said motor whereby the excitation produced by said motor field winding is increased or decreased to maintain the speed of said motor at a substantially constant predetermined value.

2. In combination, a direct current motor having a direct current-energized field exciting winding, means adapted to be excited by a source of standard frequency alternating current for modifying the excitation produced by said motor field winding to maintain the speed of said motor substantially in synchronism with said standard frequency alternatng current, and a synchronous switch driven by said motor, said switch having a conducting portion and a non-conducting portion and being arranged in series with said source of alternating current so that said modifying means is connected to said source of alternating current during half of each cycle thereof, said modifying means increasing or decreasing the excitation produced by said motor field winding in response to the polarity of said half cycles passed by said switch, said switch connecting said modifying means to said source of alternating current during a more negative or more positive half of each cycle of said alternating current in response to a slight change of speed of said motor whereby the excitation produced by said motor field winding is increased or decreased to return the speed of said motor to said synchronous speed.

3. In combination, a direct current motor of the amplidyne type having a direct current-energized control field exciting winding, means adapted to be excited by a source of standard frequency alternating current for modifying the excitation produced by said control field winding, and a synchronous switch driven by said motor, said switch having a conducting portion and a non-conducting portion and being arranged in series with said source of alternating current so that said modifying means is connected to said alternating current source during a portion of each cycle thereof, said modifying means increasing or decreasing the excitation produced by said control field winding in response to the polarity of the alternating current flowing during said cycle portions, said switch connecting said modifying means to said standard frequency source during a more negative or more positive portion of each cycle in response to a slight change of speed of said motor whereby said modifying means increases or decreases the excitation produced by said motor field winding to maintain the speed of said motor at a substantially constant predetermined value.

4. In combination, a direct current motor having a direct current-energized main field exciting winding, a second field exciting winding on said motor adapted to be excited by a source of standard frequency alternating current for modifying the excitation produced by said main field winding, and a synchronous switch driven by said motor, said switch having a conducting portion and a non-conducting portion and being arranged in series with said source of alternating current to connect said second motor field winding to said source of alternating current during a portion of each cycle thereof, said second motor field winding bucking or boosting said main field winding in response to the polarity of said cycle portions passed by said switch, said switch connecting said second motor field winding to said source of alternating current during a more negative or more positive portion of each cycle of said alternating current in response to a slight change of speed of said motor whereby the excitation produced by said main field winding is increased or decreased to maintain the speed of said motor at a substantially constant predetermined value.

5. In combination, a direct current motor of the amplidyne type having a direct current-energized main control field exciting winding, a regulating control field winding on said motor arranged to be excited by a source of standard frequency alternating current for modifying the excitation produced by said main control field winding, and a synchronous switch driven by said motor, said switch having a conducting portion and a non-conducting portion and being arranged in series with said source of alternating current to connect said regulating control field winding to said source of alternating current during half of each cycle thereof, said regulating control field winding bucking or boosting said main control field winding in response to the polarity of said cycle portions passed by said switch, said switch connecting said regulating control field winding to said source of alternating current during a more negative or more positive half of each cycle of said alternating current in response to a slight change of speed of said motor whereby the excitation produced by said main control field winding is increased or decreased to maintain the speed of said motor at a substantially constant predetermined value.

6. In combination, a direct current motor of the amplidyne type having a direct current-energized main control field exciting winding, a regulating control field winding on said motor adapted to be excited by a source of standard frequency alternating current for bucking or boosting said main control field winding to maintain the speed of said motor substantially in synchronism with said source of standard frequency alternating current, and a synchronous switch driven by said motor, said switch having a conducting portion and a non-conducting portion and being arranged in series with said source of alternating current to connect said regulating control field winding to said source of alternating current during a half of each cycle thereof, said regulating control field winding bucking or boosting said main control field winding in response to the polarity of said half cycles passed by said switch, said switch connecting said regulating control field to said source of alternating current during a more negative or more positive half of each cycle of said alternating current in response to a slight change of speed of said motor whereby the excitation produced by said main control field winding is increased or decreased to return the speed of said motor to said synchronous speed.

7. In combination, a direct current motor having its armature arranged to be energized from an external source of direct current and having a direct current-excited shunt field exciting winding, a direct current generator of the amplidyne type driven by said motor and having its direct axis brushes arranged in series with said motor field winding for bucking or boosting said motor field winding, said amplidyne generator having a direct current-excited main control field exciting winding, means adapted to be excited by a source of standard frequency alternating current for modifying the excitation produced by said amplidyne main control field winding, and means driven by said motor for connecting said modifying means to said source of alternating current during a portion of each cycle thereof, said modifying means increasing or decreasing the excitation produced by said amplidyne main control field winding in response to the polarity of the alternating current flowing during said cycle portions, said connecting means connecting said modifying means to said source of alternating current during a more negative or more positive portion of each cycle in response to a slight change of speed of said motor whereby said modifying means increases or decreases the excitation produced by said amplidyne main field winding to increase or decrease the bucking or boosting effect of said amplidyne on said motor shunt field winding maintaining the speed of said motor at a substantially constant predetermined value.

8. In combination, a direct-current motor having its armature arranged to be energized from an external source of direct current and having a direct current-excited shunt field exciting winding, a direct current generator of the amplidyne type driven by said motor and having its direct axis brushes arranged in series with said motor field winding for bucking or boosting said motor field winding, said amplidyne generator having a direct current-excited main control field exciting winding, a regulating control field exciting winding on said amplidyne adapted to be excited by a source of standard frequency alternating current for modifying the excitation produced by said amplidyne main control field winding, and a synchronous switch driven by said motor for connecting said amplidyne regulating control field winding to said alternating current source during a portion of each cycle thereof, said amplidyne regulating control field winding increasing or decreasing the excitation produced by said amplidyne main field winding in response to the polarity of the alternating current flowing during said cycle portions, said switch connecting said amplidyne regulating control field winding to said standard frequency source during a more negative or more positive portion of each cycle in response to a slight change of speed of said motor whereby said amplidyne regulating control field winding increases or decreases the excitation produced by said amplidyne main control field winding to increase or decrease the bucking or boosting effect of said amplidyne on said motor shunt field winding maintaining the speed of said motor at a substantially constant predetermined value.

9. In combination, a direct current motor having its armature arranged to be energized from an external source of direct current, and having a direct current-excited shunt field exciting winding, a direct current generator of the amplidyne type driven by said motor and having its direct axis brushes arranged in series with said motor field winding for bucking or boosting said motor field winding, said amplidyne generator having a direct current-excited main control field exciting winding, a regulating control field exciting winding on said amplidyne adapted to be excited by a source of standard frequency alternating current for modifying the excitation produced by said amplidyne main control field winding, and a synchronous switch driven by said motor for connecting said amplidyne regulating control field winding to said alternating current source during half of each cycle thereof, said amplidyne regulating control field winding increasing or decreasing the excitation produced by said amplidyne main control field winding in response to the polarity of said half cycles passed by said switch, said switch connecting said amplidyne regulating control field winding to said standard frequency source during a more negative or more positive half of each cycle in response to a slight change of speed of said motor whereby said amplidyne regulating control field winding increases or decreases the excitation produced by said amplidyne main field winding to increase or decrease the bucking or boosting effect of said amplidyne on said motor shunt field winding maintaining the speed of said motor at a substantially constant predetermined value.

10. In combination, a direct current motor having its armature arranged to be energized from an external source of direct current and having a direct current-excited shunt field exciting winding, a direct current generator of the amplidyne type driven by said motor and having its direct axis brushes in series with said motor field winding for bucking or boosting said motor field winding to maintain the speed of said motor substantially in synchronism with a standard frequency alternating source current, said amplidyne generator having a direct current-excited main control field exciting winding, a regulating control field exciting winding on said amplidyne adapted to be excited by said source of alternating current for modifying the excitation produced by said amplidyne main control field winding, and a synchronous switch driven by said motor for connecting said amplidyne regulating control field winding to said alternating current source during half of each cycle thereof, said amplidyne regulating control field winding increasing or decreasing the excitation produced by said amplidyne main control field winding in response to the polarity of said half cycles passed by said switch, said switch connecting said amplidyne regulating control field winding to said standard frequency source during a more negative or more positive half of each cycle in response to a slight change of speed of said motor whereby said amplidyne regulating control field winding increases or decreases the excitation produced by said amplidyne main field winding to increase or decrease the bucking or boosting effect of said amplidyne on said motor shunt field winding returning the speed of said motor to said synchronous speed.

11. In combination, a direct current motor having its armature arranged to be energized from an external source of direct current and having a direct current-excited shunt field exciting winding, a direct current generator of the amplidyne type driven by an external source of power and having its direct axis brushes arranged in series with said motor field winding for bucking or boosting said motor field winding, said amplidyne generator having a direct current-excited main control field exciting winding, means adapted to be excited by a source of standard frequency alternating current for modifying the excitation produced by said amplidyne main control field winding, and a synchronous switch driven by said motor, said switch having a conducting portion and a non-conducting portion and being arranged in series with said source of alternating current so that said modifying means is connected to said source of alternating current during a portion of each cycle thereof, said modifying means increasing or decreasing the excitation produced by said amplidyne main control field winding in response to the polarity of the alternating current flowing during said cycle portions, said switch connecting said modifying means to said source of alternating current during a more negative or more positive portion of each cycle in response to a slight change of speed of said motor whereby said modifying means increases or decreases the excitation produced by said amplidyne main field winding to increase or decrease the bucking or boosting effect of said amplidyne on said motor shunt field maintaining the speed of said motor at a substantially constant predetermined value.

12. In combination, a direct current motor having its armature arranged to be energized from an external source of direct current and having a direct current-excited shunt field exciting winding, a direct current generator of the amplidyne type having its direct axis brushes arranged in series with said motor field winding for bucking or boosting said motor field winding, said amplidyne generator having a direct current-excited main control field exciting winding, means adapted to be excited by a source of standard frequency alternating current for modifying the excitation produced by said amplidyne main control field winding, and a synchronous switch driven by said motor, said switch having a conducting portion and a non-conducting portion and being arranged in series with said source of alternating current so that said modifying means is connected to said source of alternating current during a portion of each cycle thereof, said modifying means increasing or decreasing the excitation produced by said amplidyne main control field winding in response to the polarity of the alternating current flowing during said cycle portions, said switch connecting said modifying means to said source of alternating current during a more negative or more positive portion of each cycle in response to a slight change of speed of said motor whereby said modifying means increases or decreases the excitation produced by said amplidyne main field winding to increase or decrease the bucking or boosting effect of said amplidyne on said motor shunt field maintaining the speed of said motor at a substantially constant predetermined value.

13. In combination, a direct current motor having its armature arranged to be energized from an external source of direct current and having a direct current-excited shunt field exciting winding, a direct current generator of the amplidyne type driven by an external source of power and having its direct axis brushes arranged in series with said motor field winding for bucking or boosting said motor field winding, said amplidyne generator having a direct current-excited main control field exciting winding, a regulating control field exciting winding on said amplidyne adapted to be excited by a source of standard frequency alternating current for modifying the excitation produced by said amplidyne main control field winding, and a synchronous switch driven by said motor, said switch having a conducting portion and a non-conducting portion and being arranged in series with said source of alternating current so that said amplidyne regulating control field winding is connected to said alternating current source during a portion of each cycle thereof, said amplidyne regulating control field winding increasing or decreasing the excitation produced by said amplidyne main field winding in response to the polarity of the alternating current flowing during said cycle portions, said switch connecting said amplidyne regulating control field winding to said standard frequency source during a more negative or more positive portion of each cycle in response to a slight change of speed of said motor whereby said amplidyne regulating control field winding increases or decreases the excitation produced by said amplidyne main control field winding to increase or decrease the bucking or boosting effect of said amplidyne on said motor shunt field winding maintaining the speed of said motor at a substantially constant predetermined value.

14. In combination, a direct current motor having its armature arranged to be energized from an external source of direct current and having a direct current-excited shunt field exciting winding, a direct current generator of the amplidyne type driven by an external source of power and having its direct axis brushes arranged in series with said motor field winding for bucking or boosting said motor field winding, said amplidyne generator having a direct current-excited main control field exciting winding, a regulating control field exciting winding on said amplidyne adapted to be excited by a source of standard frequency alternating current for modifying the excitation produced by said amplidyne main control field winding, and a synchronous switch driven by said motor, said switch having a conducting portion and a non-conducting portion and being arranged in series with said source of alternating current so that said amplidyne regulating control field winding is connected to said alternating current source during half of each cycle thereof, said amplidyne regulating control field winding increasing or decreasing the excitation produced by said amplidyne main control field winding in response to the polarity of said half cycles passed by said switch, said switch connecting said amplidyne regulating control field winding to said standard frequency source during a more negative or more positive half of each cycle in response to a slight change of speed of said motor whereby said amplidyne regulating control field winding increases or decreases the excitation produced by said amplidyne main field winding to increase or decrease the bucking or boosting effect of said amplidyne on said motor shunt field winding maintaining the speed of said motor at a substantially constant predetermined value.

15. In combination, a direct current motor having its armature arranged to be energized from an external source of direct current and having a direct current-excited shunt field exciting winding, a direct current generator of the amplidyne type driven by an external source of power and having its direct axis brushes arranged in series with said motor field winding for bucking or boosting said motor field winding to maintain the speed of said motor in synchronism with a standard frequency alternating-current source, said amplidyne generator having a direct current-excited main control field exciting winding, a regulating control field exciting winding on said amplidyne adapted to be excited by said source of alternating current for modifying the excitation produced by said amplidyne main control field winding, and a synchronous switch driven by said motor, said switch having a conducting portion and a non-conducting portion and being arranged in series with said source of alternating current so that said amplidyne regulating control field winding is connected to said alternating current source during half of each cycle thereof, said amplidyne regulating control field winding increasing or decreasing the excitation produced by said amplidyne main control field winding in response to the polarity of said half cycles passed by said switch, said switch connecting said amplidyne regulating control field winding to said standard frequency source during a more negative or more positive half of each cycle in response to a slight change of speed of said motor whereby said amplidyne regulating control field winding increases or decreases the excitation produced by said amplidyne main field winding to increase or decrease the bucking or boosting effect of said amplidyne on said motor shunt field winding returning the speed of said motor to said motor to said synchronous speed.

16. In combination, a direct current motor having a direct current-energized shunt field exciting winding, a second field exciting winding on said motor adapted to be excited by a source of standard frequency alternating current for modifying the excitation produced by said shunt field winding, and a synchronous switch driven by said motor, said switch having a conducting portion and a non-conducting portion and being arranged in series with said source of alternating current to connect said second field winding to said source of alternating current during a portion of each cycle thereof, said second field winding bucking or boosting said shunt field winding in response to the polarity of said cycle portions passed by said switch, said switch connecting said second field winding to said source of alternating current during a more negative or more positive portion of each cycle of said alternating current in response to a slight change of speed of said motor whereby the excitation produced by said shunt field winding is increased or decreased to maintain the speed of said motor at a substantially constant predetermined value.

HENRY C. ROEMKE.

REFERENCES CITED

The following references are of record in the file of this patent:

UNITED STATES PATENTS

| Number | Name | Date |
|---|---|---|
| 1,606,764 | Hartley | Nov. 16, 1926 |
| 1,688,916 | Bock | Oct. 23, 1928 |
| 1,708,642 | Vopel | Apr. 9, 1929 |
| 1,834,267 | Bonn | Dec. 1, 1931 |
| 2,137,071 | Young | Nov. 15, 1938 |